3,206,438
INTERFACIAL PREPARATION OF POLYAMIDES WITH WATER INSOLUBLE INORGANIC COMPOUNDS AS ACID BINDERS
Saunders Eliot Jamison, Summit, N.J., assignor to Celanese Corporation of America, New York, N.Y., a corporation of Delaware
No Drawing. Filed Jan. 10, 1961, Ser. No. 81,701
4 Claims. (Cl. 260—78)

This invention relates to an improved process for the production of condensation polymers.

Various processes are known for the production of condensation polymers wherein a basic reactant or intermediate and a non-basic reactant are utilized and an acidic by-product is liberated. For example, high molecular weight polymers may be prepared by reacting an acid halide such as a dicarboxylic acid halide, a sulfonyl halide, a bis-dihaloformate of a dihydric alcohol, or phosgene with a diamine. In this type of reaction a hydrogen halide is liberated as a result of the condensation of the reactants.

It is an object of this invention to provide an improved process of producing condensation polymers wherein a basic reactant is utilized and an acidic by-product is formed. It is a further and more specific object of this invention to provide a process of producing condensation polymers of the type wherein a basic reactant is utilized in liquid phase and an acidic by-product is formed, such that a high yield of polymer having a high inherent viscosity is obtained. Further objects will be apparent from the following description and claims.

In accordance with one aspect of the invention, a process of producing a condensation polymer of a basic reactant and a non-basic reactant such that an acidic by-product is formed, is carried out in the presence of an acid-binding compound. The total amount of acid-binder supplied during the reaction is sufficient to completely neutralize the total amount of acid liberated during the reaction. However, the amount of acid-binder dissolved in the liquid medium containing the condensing reactants at any given time during the reaction is less than the amount necessary to completely neutralize the total amount of liberated acid, and is preferably less than 50% and most suitably less than 10% of such amount.

The solubility of the acid-binder in the liquid phase containing the basic reactant will generally be no higher than 0.1%, preferably no higher than 0.05% and most suitably no higher than 0.01% by weight of the solvent of said liquid phase, e.g. water, at the temperature of the reaction. It has been found that keeping at least part of the acid-binder necessary for the neutralization of the liberated acid out of solution during the polymerization reaction makes it possible to obtain polymers of particularly high inherent viscosity.

The process of this invention is particularly effective when carried out such that the reactants are present in two immiscible phases at least one of which contains a liquid diluent. This may be accomplished in various ways, e.g. by contacting a first reactant which is liquid, or a solution or dispersion of a first reactant in a liquid medium with a solution or dispersion of the second reactant in a liquid medium, the latter solution or dispersion being immiscible with the liquid consisting of or containing the first reactant. In this type of process, the acidic by-product often tends to be absorbed in the phase containing the basic reactant and the solubility of the acid binder in this phase is as stated above. On the other hand, the solubility of the acid binder in the phase containing the non-basic reactant should be even less than, e.g. no more than one half of, its solubility in the phase containing the basic reactant. Preferably, the solubility of the acid binder in the phase containing the non-basic reactant is substantially negligible.

Of particular interest are reactions where an aqueous solution or dispersion of a basic reactant, e.g. a diamine is contacted with a solution or dispersion of a water-insoluble, non-basic reactant, e.g. an acid halide such as dicarboxylic acid dihalide, in an organic solvent, the liquid phase containing the non-basic reactant being immiscible with the aqueous solution or dispersion of the basic reactant. As the reaction proceeds, the liberated acid tends to combine with the basic reactant in the aqueous phase to form a salt, if there is no added acid binder to eliminate the acidic by-product as it is formed.

The acid binder used in the latter type of process, i.e. wherein a basic reactant is dissolved or dispersed in an aqueous phase may be any of various basic compounds which are substantially insoluble in water, e.g., which have a solubility in water at no greater than 0.1% by weight of water present, at the temperature of the reaction. Examples of such compounds are; magnesium oxide, magnesium hydroxide, magnesium carbonate, calcium carbonate, and barium carbonate. It has been found that magnesium oxide yields particularly desirable results in terms of the high inherent viscosities of the polymers obtained.

Unlike the case with more soluble acid-binders such as sodium compounds, an excess of the insoluble acid-binder of this invention may be used without adversely affecting the inherent viscosity or yield of the polymer. The insoluble acid-binder may be present, for example, in an amount of 1 to 4 or more equivalents per equivalent of acid liberated. However, an amount of acid-binder much above the stoichiometric amount necessary to neutralize the acid liberated during the reaction does not contribute any appreciable advantage to the process. The acid-binder is most conveniently added to the aqueous phase before mixing or to the mixture of phases.

In the production of polyamides by contacting an aqueous solution of a diamine with an organic solvent solution of a dicarboxylic acid dihalide, a large variety of diamines, dicarboxylic acid dihalides and organic solvents may be used. For example, the diamine may be an alkylene diamine wherein the alkylene group contains 0 to 10 or more carbon atoms such as ethylene diamine, trimethylene diamine, tetramethylene diamine, pentamethylene diamine, hexamethylene diamine, octamethylenediamine, and hydrazine, arylene diamines such as ortho-, meta- or para-phenylene diamine, cycloalkylene diamines such as 1,4-cyclohexylene diamine, and nuclearly-substituted phenylene diamines and nuclearly substituted-cyclohexylene diamines and heterocyclic diamines such as piperazine. N-substituted diamines which contain a free amino hydrogen on each amino group are also suitable.

Other diamines which also may be employed are, for example, $\alpha,\omega$-di(3-aminopropoxy)-alkanes, such as 1,4-di-(3-aminopropoxy)-butane, bis-($\omega$-amino alkyl) ethers such as 3,3'-diamine-di-propyl-ether, 4,4'-diamine-dicyclohexyl methane, bis-($\omega$-amino-alkyl) sulfides such as 2,2'-diamino-di-ethyl-sulfide, 1,2-,1,3- or 1,4-$\alpha,\alpha'$-diamino xylene or other $\omega,\omega'$-diamino dialkyl benzenes, diamino-naphthalene, diamino-biphenyl, $\omega,\omega'$-diamino-dialkyl biphenyls, $\omega$-amino-alkyl anilines, $\omega$-amino-alkyl cyclohexylamines, bis-($\omega$-amino-alkoxy)-benzene, bis-($\omega$-amino-alkoxy)-cyclohexane; 4,4'-diamino-dicyclohexyl sulfones, $\omega,\omega'$-sulfonyl-bis-alkyl amines, diamino diphenyl sulfones, diamino-benzophenones and N, N'-bis($\omega$-amino-alkyl)-$\alpha,\omega$-alkane disulfonamides. Amines containing more than two reactive amino groups, either primary or secondary, such as diethylene triamine or triethylene tetramine, for example, yield branch chain polyamides. Such polymers, if they contain moderately branched chains, are of relatively low melting point. If the chains are highly branched, the polymers approach and may even reach substantial infusibility.

As examples of dicarboxylic acid dihalides which may be employed in the polymerization process, there may be mentioned alkane dicarboxylic acids containing 2 to 12 or more carbon atoms such as adipyl chloride, sebacyl chloride, succinoyl chloride, glutaroyl chloride, pimelic acid chloride, suberic acid chloride, and azelaic acid chloride. The diacid dichlorides of aliphatic chains containing ether, thioether and sulphone groups in the chain between the acid chloride groups are also satisfactory. Cyclic compounds such as phthalic acid dichloride, terephthalic acid dichloride, (terephthaloyl chloride) p,p'-diphenyl oxide dicarboxylic acid chloride, p,p'-benzophenone dicarboxylic acid chloride, 1,4-cyclohexane dicarboxylic acid chloride, p,p'-di-phenyl sulfide dicarboxylic acid chloride, 4,4'-diphenyl methane dicarboxylic acid chloride, $\beta,\beta$-phenylene dioxy bis-propionyl chloride $\beta,\beta$-phenylene dithio bis-propionyl chloride $\beta,\beta$-phenylene disulfonyl bis-propionyl chloride and p-phenylene bis-acetyl chloride may also be employed. In addition, halides other than chlorides such as the bromides, fluorides, and iodides corresponding to the above chlorides may also be used, e.g. terephthaloyl bromide.

Suitable organic solvents for the dicarboxylic acid dihalides are aromatic solvents such as xylene, benzene and toluene, other nonhydroxylated organic solvents such as chloroform, carbon tetrachloride, or other chlorinated aliphatic or aromatic hydrocarbons, alkanes, such as normal and branch chain pentane, hexane, heptane and octane and various petroleum fractions such as gasoline or kerosene fractions. The aromatic solvents yield particularly advantageous results.

Temperatures of from as low as −15° C. up to the boiling point of the lowest boiling liquid phase in the reaction medium may be maintained when carrying out the polymerization process. The lower temperature may be achieved, for example, with the aid of dissolved salts such as magnesium chloride.

The concentration of the diamine in the aqueous solution employed and the concentration of the dicarboxylic acid chloride in the organic solvent may vary. For example, both the diamine and the dicarboxylic acid chloride may be employed in a concentration of from 0.01 to 5 mols per liter of solvent. The reactants undergoing polymerization need not be present in equi-molecular ratio. The organic solvent may suitably be present, for example, in a ratio of about 0.6 to 1.2 volumes for each volume of water employed in the polymerization.

The heterogeneous polymerization process may be carried out either as a batch process or as a continuous process. When the polymerization is effected in a batch-wise manner, the diamine, for example, may be dissolved in water to which is added the insoluble binding agent, and while agitating said aqueous diamine solution, a solution of a dicarboxylic acid chloride in a suitable organic solvent may be gradually added. Stirring is continued and the polyamide precipitates out as it is formed. After filtration and washing, the finely divided polymer may then be subjected to shaping operations whereby films, filaments and molded articles may be obtained.

The batch polymerization may also be carried out by utilizing a somewhat modified process. Thus, for example, as the initial step the diamine is dissolved in water in the form of an acid salt such as its hydrochloride, sulfate, acetate or carbonate, and the aqueous solution formed is then strongly agitated with a solution of the dicarboxylic acid chloride in an organic solvent. This initial step forms a dispersion of the reactants, but polymerization does not take place since the amine groups of the diamine are bound or blocked, being present in salt form. Upon the gradual addition of the insoluble acid-binder to the emulsion, while agitation is continued, the amine hydrochloride is gradually neutralized and the diamine is freed to undergo polymerization with the acid chloride. In effecting the actual polymerization, a sufficient amount of the alkaline agent is added to free all of the diamine and to react with the hydrogen chloride which is formed as byproduct of the reaction.

It has been found that the process of this invention yields particularly desirable results in terms of inherent viscosity of the polymer obtained when used to produce polyterephthalamides, e.g. poly(polymethylene) terephthalamides wherein the polymethylene groups contain, for example, from 2 to 10 carbon atoms, such as polyhexamethylene terephthalamide, polytetramethylene terephthalamide, polyethylene terephthalamide, polyoctamethylene terephthalamide and polypiperazylene terephthalamide. For example, linear, polymeric terepthalamides, having inherent viscosities as high as 0.8 or over 1.0 e.g. 1.3 or higher, measured in sulfuric acid, can be obtained. The inherent viscosity of a polymer is dependent on its molecular weight and is significant in that polymers of higher inherent viscosities generally yield articles having superior mechanical properties. For example, filaments spun from polymers of higher inherent viscosity usually have higher tenacity and elongation which can be more significantly improved by subsequent drawing, than filaments spun from polymers of lower inherent viscosity.

The polymerization may also be carried out effectively in continuous manner by simultaneously passing both the aqueous solution of diamine, to which the insoluble acid-binder has been added, and the organic solvent solution of the dicarboxylic acid chloride into a reactor where the reactants are mixed with strong agitation and, when polymerization has been effected, the precipitated polymer is separated from the supernatant liquid.

The following examples further illustrate the invention.

*Example I*

To a Waring Blendor were added 2.9 grams (0.025 mol) of hexamethylene diamine, 150 milliliters of water, 1.0 gram (0.5 gram equivalent) of finely divided magnesium oxide as an acid-binder and 100 milliliters of xylene. With the Blendor in operation a solution of 5 grams (0.025 mol) of terephthaloyl chloride in 50 milliliters of xylene was slowly filtered into it and agitation was continued for 15 minutes. After filtering and washing the polymer was found to have been obtained in a yield of 84% by weight of the theoretical maximum. Its inherent viscosity measured in a solution in sulfuric acid was found to be 1.33.

*Example II*

The procedure of Example I was repeated except that 1.45 grams (0.0125 mol) of hexamethylene diamine, 0.5 gram (0.025 gram equivalent) of magnesium oxide, and 2.5 grams (0.0125 mol) of terephthaloyl chloride were used. The polymer was obtained in a yield of 92% by weight and had an inherent viscosity measured in sulfuric acid of 1.20.

*Example III*

The procedure of Example II was followed except that 1.25 grams (0.025 gram equivalent) of calcium carbonate rather than magnesium oxide was used as the acid-binder. The polymer was obtained in a yield of 59% by weight. Its inherent viscosity as measured in sulfuric acid was 0.83.

The procedure of Examples II and III was repeated except that 1 gram (0.025 gram equivalent) of sodium hydroxide was used in place of magnesium oxide or calcium carbonate as the acid-binder. The inherent viscosity of the resulting polymer measured in sulfuric acid was found to be 0.60.

The procedure of Examples II and III was again repeated except that no acid-binder was used. The yield of polymer obtained was 46% by weight of the theoretical maximum and its inherent viscosity measured in sulfuric acid was 0.72.

Example IV

The procedure of Example II was followed except that 0.75 gram of ethylene diamine was used instead of 1.45 grams of hexamethylene diamine. The polymer was obtained in a yield of 92% by weight and had an inherent viscosity as measured in sulfuric acid of 0.66.

The procedure of Example IV was repeated except that no acid-binder was used. The yield of polymer obtained was 39% by weight and its inherent viscosity measured in sulfuric acid was 0.51.

Example V

The procedure of Example II was followed except that 1.07 grams of piperazine instead of 1.45 grams of hexamethylene diamine was used as the diamine reactant. The polymer was obtained in a yield of 71% by weight and had an inherent viscosity measured in sulfuric acid of 0.76.

The procedure of Example V was repeated except that no acid binder was used. The polymer was obtained in a yield of 28% by weight and its inherent viscosity measured in sulfuric acid was 0.41.

In addition to the preparation of polymers of high inherent viscosity, the polymerization process of this invention may be used to obtain polymers having a low degree of cross linking and which yield a minimum of insoluble gels when dissolved in a solvent, e.g., concentrated sulfuric acid, in preparing a solution suitable for the formation of shaped articles such as filaments. This gel-forming tendency may be indicated by the "plugging value" of the polymer which is an experimentally determined value inversely related to the tendency of the polymer to plug the pores of a filtering medium. The plugging value may be determined, for example, by filtering a dilute solution of the polymer through a standard filtering medium at standard conditions of pressure drop and temperature, measuring the volume of filtrate at definite time intervals, plotting $t/v$ as the ordinate against $t$ as the abscissa where $t$ is the time and $v$ the corresponding volume of filtrate, and multiplying the reciprocal of the slope of the resulting straight line by the polymer concentration and dividing by the area of the filter. The units may be chosen so that the plugging value is given in grams per square centimeter. By means of the process of this invention, polyhexamethylene terephthalamide may be obtained having a plugging value of at least 0.2 or 0.3 gram per square centimeter using for the determination a dilute solution of the polymer in concentrated sulfuric acid at room temperature, and one atmosphere pressure drop across a fine filter of sintered glass.

The following example illustrates the preparation of a polymer of relatively high plugging value.

Example VI

To a reactor fitted with a turbine agitator was added a solution of 3.32 pounds of hexamethylene diamine in 374.4 pounds of deionized water, which solution also contained 1.24 pounds of magnesium oxide. The temperature of the solution was adjusted to 30° C. While the latter solution was being agitated, a solution of 5.3 pounds of terephthaloyl chloride in 322.3 pounds of p-xylene at room temperatunre i.e. about 22° C., was added over a 15 minute period. After 30 minutes of agitation, the reactor walls were flushed free of splashed polymer with water. Agitation was continued for another 190 minutes. The resulting mass was then centrifuged to remove water and p-xylene. The solid polymer was reslurried in 60 gallons of methanol at room temperature, agitated for 30 minutes and centrifuged. The polymer was again reslurried in 60 gallons of methanol, agitated for 60 minutes and centrifuged. The entire step of reslurrying the polymer twice and agitating for 30 and 60 minute periods was repeated with 60 gallon batches each of 50% by volume acetic acid, deionized water and again with methanol. The polymer was dried in hot air at 50° C. to a moisture content of less than 1% by weight. It had an inherent viscosity of 1.19 deciliters per gram.

The plugging value of the polymer of this example was determined as follows: concentrated sulfuric acid of about 98% concentration was passed through a funnel-shaped fine sintered glass filter having pores of about 15 microns in diameter and a filter area of about 10 square centimeters. Vacuum was applied at the outlet side of the filter until the acid was being sucked through at a constant rate. The acid was discarded and the filtration of a solution of the polymer in concentrated sulfuric acid was begun. The solution being filtered had a concentration of 0.4 gram of polymer per deciliter of acid and was at room temperature, i.e. about 22° C. Vacuum was maintained at the outlet side of the filter so that the pressure drop across the filter was about one atmosphere. The volume of filtrate ($v$) and the total time period of filtration ($t$) was recorded every minute or every few minutes. After a short time, i.e., about 10 or 15 minutes, $v$ was plotted against $t$ and the curve extrapolated to zero time ($t=0$). The extrapolated value of $v$ thus obtained was then subtracted from each value of $v$ obtained. Filtration was continued with values of $v$ and $t$ being recorded every few minutes until 250 ml. of filtrate was obtained which took 64 minutes. Values of $t/v$ as ordinate were then plotted against corresponding values of $t$ as abscissa and the best straight line was drawn through the points. The reciprocal of the slope of this straight line was then multiplied by the polymer concentration of the solution in gram per volume unit and divided by the area of the filter in square centimeters to obtain a plugging value of 0.36 gram per square centimeter.

In addition to the production of polyamides by the reaction of a diamine and a dicarboxylic acid dihalide as illustrated above, the process of this invention may be applied to various other reactions wherein a condensation polymer is produced by reacting a basic reactant or intermediate which is dispersed or dissolved in one liquid phase with a non-basic reactant or intermediate dispersed or dissolved in another liquid phase, the two phases being immiscible, such that an acidic byproduct is liberated which tends to be absorbed in the phase containing the basic reactant. For example, the process may be applied to the following types of reaction:

(1) The reaction of a dihalide of a dicarboxylic acid and a diamine to form a polyamide and a hydrogen halide as illustrated above.

(2) The reaction of a bis-(halo formate) of a dihydric alcohol and a diamine to form a polyurethane and a hydrogen halide, e.g. the reaction of bis-(chloro formate) of butane-1,4-diol and tetramethylene diamine to form a specific polyurethane and hydrogen chloride.

(3) The reaction of a carbon oxide halide and a diamine to form a polyurea and a hydrogen halide, e.g. the reaction of phosgene and hexamethylene diamine to form a specific polyurea and hydrogen chloride.

(4) The reaction of a di-sulfonic acid halide and a diamine to yield a poly-sulfonamide and hydrogen halide, e.g. the reaction of m-benzene disulfonyl chloride and hexamethylene diamine to yield a specific polysulfonamide and hydrogen chloride.

In each of the above reactions the diamines may be any of the various diamines listed above in connection with the formation of polyamides from dicarboxylic acid dihalides and diamines.

The polymers produced by means of the process of this invention may be formed into useful shaped articles, e.g. filaments, films and molded articles using various techniques of melt spinning, wet spinning or dry spinning or various molding techniques.

The inherent viscosity of the polymers of the examples given above represents the function $$\frac{\ln \eta_r}{c}$$

where $\ln \eta_r$ is the natural logarithm of $\eta_r$, the relative viscosity of a very dilute solution of the polymer in concentrated sulfuric acid at 25° C., and $c$ is the polymer concentration in grams per deciliter of solvent. The inherent viscosity is thus obtained in deciliters per gram. The inherent viscosity of the polymers of Examples I to V was obtained using a polymer concentration of 0.1 gram per deciliter while that of the polymer of Example VI was obtained using a concentration of 0.4 gram per deciliter.

In the following claims, the term "dispersed" is intended to cover both true solutions and dispersions proper, e.g. colloidal dispersion.

It is to be understood that the foregoing detailed description is merely given by way of illustration and that many variations may be made therein without departing from the spirit of my invention.

This application is a continuation-in-part of application Serial No. 6,885, filed February 5, 1960, now abandoned.

Having described my invention, what I desire to secure by Letters Patent is:

1. In a process of forming a high molecular weight condensation polymer capable of being formed into shaped articles by the reaction of a diamine having an amino hydrogen on each amino group and a dicarboxylic acid dihalide, wherein said diamine dissolved in water is contacted with said dihalide dissolved in a water-immiscible organic solvent, to effect said reaction at the interface of the resulting immiscible liquid phases with the formation of a hydrogen halide by-product, the improvement comprising carrying out said reaction in the presence of an acid-binder selected from the group consisting of magnesium oxide, magnesium hydroxide, magnesium carbonate, calcium carbonate, and barium carbonate.

2. In a process of forming a high molecular weight condensation polymer capable of being formed into shaped articles by the reaction of a diamine having an amino hydrogen on each amino group with a dicarboxylic acid dihalide wherein said diamine dissolved in water is contacted with said dihalide dissolved in a water-immiscible organic solvent, and the reaction is effected at the interface of the resulting immiscible liquid phases with the formation of a hydrogen halide by-product, the improvement comprising carrying out said reaction in the presence of an inorganic acid-binder having a solubility in water of no greater than 0.1% based on the weight of the water.

3. In a process of forming a high molecular weight polyterephthalamide capable of being formed into shaped articles by the reaction of an alkylene diamine containing 2 to 10 carbon atoms and having an amino hydrogen on each amino group with terephthaloyl chloride wherein said diamine dissolved in water is contacted with said terephthaloyl chloride dissolved in an aromatic hydrocarbon solvent, and the reaction is effected at the interface of the resulting immiscible liquid phases with the formation of hydrogen chloride as by-product, the improvement comprising carrying out said reaction in the presence of magnesium oxide as acid-binder.

4. The process of claim 3 wherein said diamine is hexamethylene diamine.

References Cited by the Examiner

UNITED STATES PATENTS

| | | | |
|---|---|---|---|
| 2,281,576 | 5/42 | Hanford | 260—78 |
| 2,625,536 | 1/53 | Kirby | 260—78 |
| 2,708,617 | 5/55 | Magat et al. | 260—78 |
| 2,752,328 | 6/56 | Magat | 260—78 |
| 2,831,834 | 4/58 | Magat | 260—78 |
| 2,913,433 | 11/59 | Wittbecker | 260—78 |

WILLIAM H. SHORT, *Primary Examiner.*

MILTON STERMAN, LOUISE P. QUAST, *Examiners.*